United States Patent [19]

Leslie

[11] 4,312,708
[45] Jan. 26, 1982

[54] REACTOR STUD HOLE PLUG UNIT

[75] Inventor: Bruce E. Leslie, Baden, Pa.

[73] Assignee: Thaxton, Inc., Gibsonia, Pa.

[21] Appl. No.: 17,452

[22] Filed: Mar. 5, 1979

[51] Int. Cl.³ .............................................. G21C 13/06
[52] U.S. Cl. ..................................... 376/203; 376/463
[58] Field of Search .............................. 176/30, 37, 87

[56] References Cited

U.S. PATENT DOCUMENTS

| 303,558 | 8/1884 | Campbell. | |
| 3,353,566 | 11/1967 | Cepkauskas et al. | 176/30 X |
| 3,494,504 | 2/1970 | Jackson. | |
| 3,613,936 | 4/1970 | Kaiser et al.. | |
| 3,629,069 | 12/1971 | Wright | 176/87 |
| 3,806,167 | 4/1974 | Notari et al. | 176/87 |
| 3,851,906 | 12/1974 | Frisch et al. | 176/87 X |
| 3,926,722 | 12/1975 | Dupen | 176/87 |
| 3,979,866 | 9/1976 | Prescott | 176/87 X |
| 3,990,942 | 11/1976 | Costes | 176/87 |
| 4,116,767 | 9/1978 | John, Jr. | 176/87 |

*Primary Examiner*—Peter A. Nelson

[57] ABSTRACT

The reactor stud hole plug unit comprises a compression plate, a mandrel, an elastomeric seal ring adapted to be compressed during movement of the mandrel relative to the compression plate and a nut threaded to the mandrel to hold the unit in assembled relationship. The compression plate includes an annular rim spaced inward of the peripheral edge. The compression plate rests on the reactor wall surrounding the hole to be plugged with the rim extending into the hole. The mandrel which has a centrally threaded stud extending through the compression plate includes an upper cylindrical section and a lower cylindrical section of larger cross section with the two cylindrical sections being joined by a frustoconical section. The seal ring which has a rectangular cross section is dimensioned to snugly fit about the cylindrical upper section of the mandrel and to engage the compression plate rim in aligned relationship. Tightening of the nut draws the mandrel into the compression plate causing the ring seal to deform and fill the available space between the components of the plug unit and the wall of the hole.

8 Claims, 3 Drawing Figures

REACTOR STUD HOLE PLUG UNIT

FIELD OF THE INVENTION

This invention relates to closure members for nuclear reactors and, more particularly, to stud hole plug units or other plug units for reactors requiring temporary or semi-permanent seals.

DESCRIPTION OF THE PRIOR ART

During the refueling operation in a nuclear reactor, the closure head assembly or reactor head, which is connected to the reactor vessel, is removed and the reactor vessel is flooded with a liquid such as a boric acid solution to prevent radiation from escaping while the fuel cells are being replaced. The closure head assembly is secured to the reactor vessel by a large number of studs extending around and through the closure head assembly for threaded engagement into the wall of the reactor vessel. When these studs are removed, it is necessary to plug the stud holes in the reactor wall during refueling so that corrosion does not occur within the stud holes.

Presently, plugs are used which are generally complex in construction and include O-ring seals. However, these O-ring seals are not always reliable and leakage into the stud holes has occurred. Other standard closure members cannot be employed if they include metal expansion grips since the metal grips can damage the side of the opening into which the studs are reinstalled after the fueling operation has been completed.

The down time on a nuclear reactor is extremely expensive and it often takes as long as two weeks to complete refueling. Therefore, since the stud hole plugs must perform for periods of time up to two weeks or longer, and unnecessary delays merely add to the already expensive down time, it is necessary that a dependable and reproducible seal be formed. Other applications for nuclear reactors in which the stud hole plug or the like can be used may involve a pressurized cavity such as with an inert gas to protect threads or the like and, therefore, reproducible and predictable sealing results are mandatory.

SUMMARY OF THE INVENTION

My stud hole plug provides a positive seal and a predictable and reproducible seal from unit to unit. In addition, my stud hole plug resists etching and corrosion and can be used to close off a pressurized cavity.

My invention is a reactor stud hole plug unit comprising a compression plate, a mandrel, an elastomeric ring and a tightening means such as a nut. The compression plate includes an inner and outer surface, a peripheral edge, a central opening therethrough and an annular rim extending outward from the inner surface and spaced inward of the peripheral edge. The compression plate is dimensioned so that the peripheral edge rests on the reactor surface and the rim extends into the opening to be plugged. The mandrel has a centrally threaded stud extending outward through the compression plate. The mandrel has a cylindrical upper section and cylindrical lower section joined by a frustoconical connecting section. An elastomeric seal ring having a rectangular cross section snugly fits about the cylindrical upper section of the mandrel plate and engages the compression plate rim in aligned relationship. As the nut is tightened, the mandrel moves linearly toward the compression plate causing the seal ring to be forced along the conical section. When the compression plate bottoms on the mandrel, the seal ring has been forced to a position substantially planar with the bottom surface of the lower cylindrical section.

DESCRIPTION OF THE PREFERRED EMBODIMENTS

The closure head assembly of a nuclear reactor is secured to the reactor vessel by a large number, for example, 54 studs which extend about the perimeter of the closure head assembly and extend through the assembly into the wall of the reactor vessel. A typical stud is seven inches in diameter. In order to remove the closure member, each stud must be removed and the stud hole completely plugged so that when the reactor vessel is flooded the flooding liquid, normally boric acid, does not get into the stud holes and cause corrosion which would then prevent proper reassembly of the closure head assembly onto the reactor vessel.

Figure 1:
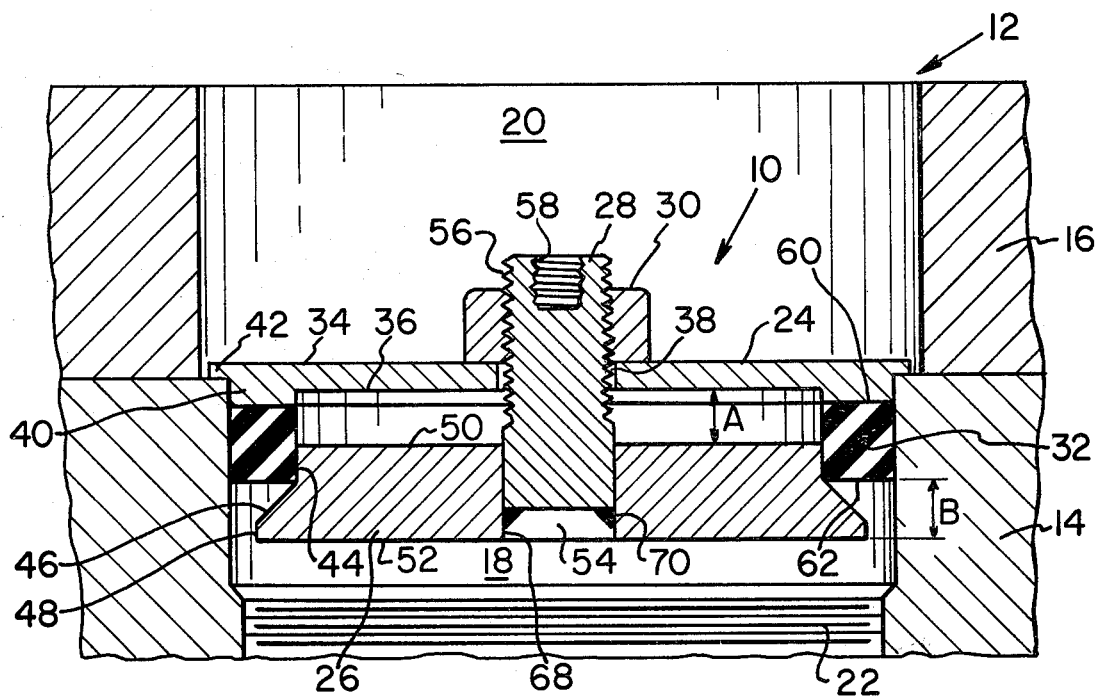
FIG. 1 is a section through my plug unit positioned within an opening and in the noncompressed state.

The sectional view of FIG. 1 illustrates my stud hole plug unit, generally designated 10, in place within a wall opening 18 of a reactor wall 14. The portion of the reactor, generally designated 12, illustrated includes a portion of the reactor head 16 having an opening 20 therethrough. The reactor head 16 is resting on the reactor wall 14 and the opening 20 through the reactor head 16 is in registry with the opening 18 in the reactor wall 14. The opening 18 in the reactor wall 14 includes internal threads 22 spaced downwardly of the top of wall 14.

As illustrated, the stud (not shown) has already been removed from the threads 22 and the plug unit 10 has been installed through the head opening 20 and into opening 18 so that it rests on the top of the reactor wall 14. The components of my plug hole unit 10 include the compression plate 24, the mandrel 26, the seal ring 32 and the nut 30.

The compression plate 24 is circular and includes an upper (outer) surface 34, a lower (inner) surface 36 and a central axial opening 38 therethrough. Extending outward from the lower surface 36 is an annular rim 40. Annular rim 40 is spaced inwardly from the periphery of the compression plate 24 so as to define a small ledge 42 which rests on the opening 18 in the reactor wall 14 as the rim 40 extends into the opening to be plugged.

The mandrel 26 includes an upper cylindrical section 44, a lower cylindrical section 48 of larger diameter than the upper cylindrical section 44 and a frustoconical connecting section 46. The mandrel 26 also includes a central opening 54 into which is inserted a stud 28. Stud 28 extends only partially through the mandrel opening 54 so as to form a recess 68 between the bottom of the stud 28 and the mandrel bottom surface 52. The stud 28 is welded to the mandrel 26 so as to become an integral part thereof. The weld 70 is generally within the recess 68. The particular unit 10 illustrated is for a seven inch stud hole and, therefore, the stud 28 and mandrel 26 were made separately and connected by the weld 70. In smaller diameter units, it may be practical to machine the stud and mandrel from the same blank so that welding is not necessary.

The stud 28 extends through the opening 38 in the compression plate and is held in assembled relationship thereto by means of nut 30 threaded on the external threads 56 of stud 28.

Figure 3:
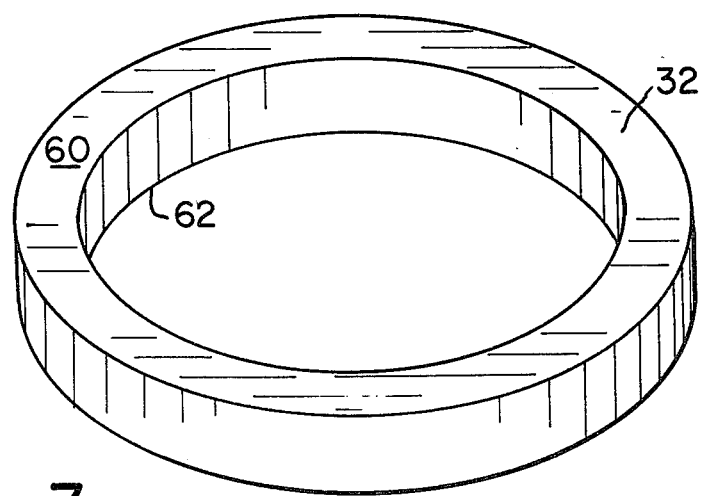
FIG. 3 is an isometric of the seal ring.

The seal is ring shaped and rectangular in cross section, FIG. 3. This rectangular cross section provides a more controlled flow as compared to a simple O-ring. The seal ring 32 is dimensioned so that its inner diameter tightly fits around the upper cylindrical section 44 of mandrel 26. In the uncompressed state, the seal ring 32 extends above the upper surface 50 of the mandrel 26. Seal 32 has an upper surface 60 which engages the rim 40 of the compression plate 24 in aligned relationship. In the uncompressed state, the bottom surface 62 of the seal ring 32 is positioned at the interface of the upper cylindrical section 44 and the frustoconical section 46.

In the uncompressed state with the compression plate 24 just resting on the seal ring 32, the lower surface 36 of the compression plate 24 is spaced from the upper surface 50 of the mandrel 26 by a distance designated A which is equal to the distance between the bottom surface of the seal 62 and the bottom surface 52 of the mandrel 26, said distance being designated B. As will be described hereinafter, the seal ring is dimensioned so that it deforms the axial extent B in the compressed state.

The unit 10 in FIG. 1 illustrates a stud 28 having an internal tap 58 whose threads (left handed) are the reverse of the external threads 56 (right handed) on the stud 28. The reason for this is to permit installation since the reactor head 16 is quite thick and a special tool must be employed to set the plug unit 10 in place, compress the seal and allow removal of the tool from the installed unit.

The particular tool (not shown) includes a long outer pipe terminating in a socket which fits nut 30 and a round bar threaded at one end and having a handle at the other end and which is positioned concentrically within the pipe so as to engage the left handed thread 58 of the stud hole.

To install the stud hole plug unit 10, the round bar is threaded to the stud 58 and the unit 10 is lowered through the reactor head 16 and into the stud hole 18 until the compression plate 24 rests on the top of the reactor wall 14. Then while the inner round bar is held stationary the outer pipe engages the nut and is turned clockwise. The turning of the nut 30 causes the mandrel 26 to advance linearly toward the compression plate 24. As this occurs, the seal ring 32 is forced down the frustoconical section 46. The mandrel 26 is moved upward until it engages the lower surface 36 of the compression plate 24, it being noted that the upper cylindrical section 44 is dimensioned to just fit within the diameter of the rim 40 of the compression plate 24.

Figure 2:
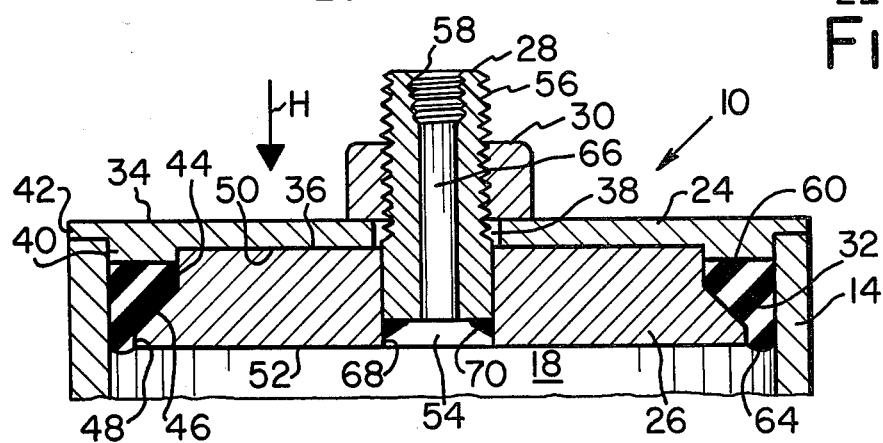
FIG. 2 is a section through a slightly modified plug unit and in the compressed state.

In the fully compressed state, FIG. 2, the seal ring 32 has been caused to flow into the confined space between the reactor wall 14 and the perimetric surface of the mandrel 26. The seal ring is so dimensioned that in the compressed state, it will extend downward to a point substantially planar or in line with the bottom surface 52 of the mandrel 26. In a typical application the flooding liquid (not shown) exerts a force or head of approximately 20 psi in the direction of the arrow H.

The particular stud 28 shown in the compressed state, FIG. 2, includes a clear through vent 66 which then permits the cavity being plugged to be pressurized, if desired.

A typical stud hole plug is machined from series 400 stainless steel and is then subjected to bright hardening, a process which gives the material substantial resistance to etching and corrosion. The ring 32, which provides a mechanical seal, is made of a halogen free Buna-N elastomer, thus providing an effective means of sealing off the stud cavity. Representative dimensions for a stud hole plug used in a seven inch stud hole having an upper unthreaded section of 7.03 inches are as follows:

Compression plate I.D. = 7.25 inches
Lip I.D. = 6.30 inches
Lip O.D. = 6.96 inches
Lip thickness = 0.20 inch
Mandrel upper cylindrical section O.D. = 6.25 inches
Mandrel lower cylindrical section O.D. = 6.75 inches
Depth of recess for stud weld = ¼ inch
cone angle = 45°
Seal thickness = ⅜ inch
Seal height = ⅝ inch
Distance of seal above mandrel top (uncompressed) = ¼ inch
Distances "A" and "B" (FIG. 1) = ¼ – ⅜ inch Stud hole plug units for reactors have been tested to determine their ability to withstand pressures created by a head wall of boric acid solution.

The plug hole units have been subjected to hydrostatic pressures in excess of 200 psi without failure of the components and without any leakage of the seal.

I claim:

1. A reactor stud hole plug unit comprising:
   A. a compression plate having an outer surface, an inner surface, a peripheral edge, a central opening therethrough and an annular rim extending from the inward surface and spaced inward of the peripheral edge, said peripheral edge defining a lip adapted to rest on a reactor surface about an opening to be closed with said rim extending into said opening;
   B. a mandrel having a central threaded stud extending outward therefrom through the compression plate central opening, said mandrel plate having a cylindrical upper section dimensioned to fit within said annular rim, a cylindrical lower section of larger diameter than the upper section and a frustoconical section connecting the upper and lower sections;
   C. an elastomeric seal ring having a rectangular cross section and dimensioned to snugly fit about the cylindrical upper section of the mandrel plate and engage the compression plate rim in aligned relationship; and
   D. a nut threadably engaging the stud so as to maintain the unit in assembled relationship and upon turning adapted to draw the mandrel plate toward the compression plate between a noncompressed state where the compression plate is spaced from the mandrel and a compressed state where the seal ring substantially fills a space defined by the annular rim, the mandrel and a wall of the opening being plugged.

2. The unit of claim 1 wherein the compression plate, when resting on the seal ring, is spaced from the mandrel a distance substantially equal to an axial extent of the frustoconical and lower sections of the mandrel and the seal ring is so dimensioned that in the compressed state the compression plate inward surface engages the mandrel and the seal ring extends to a position substantially even with a bottom surface of the mandrel lower section.

3. The unit of claim 1 wherein the stud includes means for being restrained from rotation as the nut is turned.

4. The unit of claim 3 wherein the restraining means includes a threaded tap at a distal stud end, said tap threads being the opposite of the threaded stud.

5. The unit of claim 1 wherein the stud is positioned within a central opening in the mandrel and welded thereto.

6. The unit of claim 5, said stud extending a distance into the mandrel to leave a recess between a stud end and a bottom of the mandrel, said weld positioned in said recess.

7. The unit of claim 1, said stud having an axial vent passage extending therethrough.

8. The unit of claim 1, said seal dimensioned to extend outwardly beyond the cylindrical upper section in the noncompressed state.

* * * * *